INVENTORS:
D.C. MEYERS
W.B. BANKS
L.E. SLAGLE

BY *J. H. McCarthy*

THEIR AGENT

INVENTORS:
D. C. MEYERS
W. B. BANKS
L. E. SLAGLE
BY

THEIR AGENT

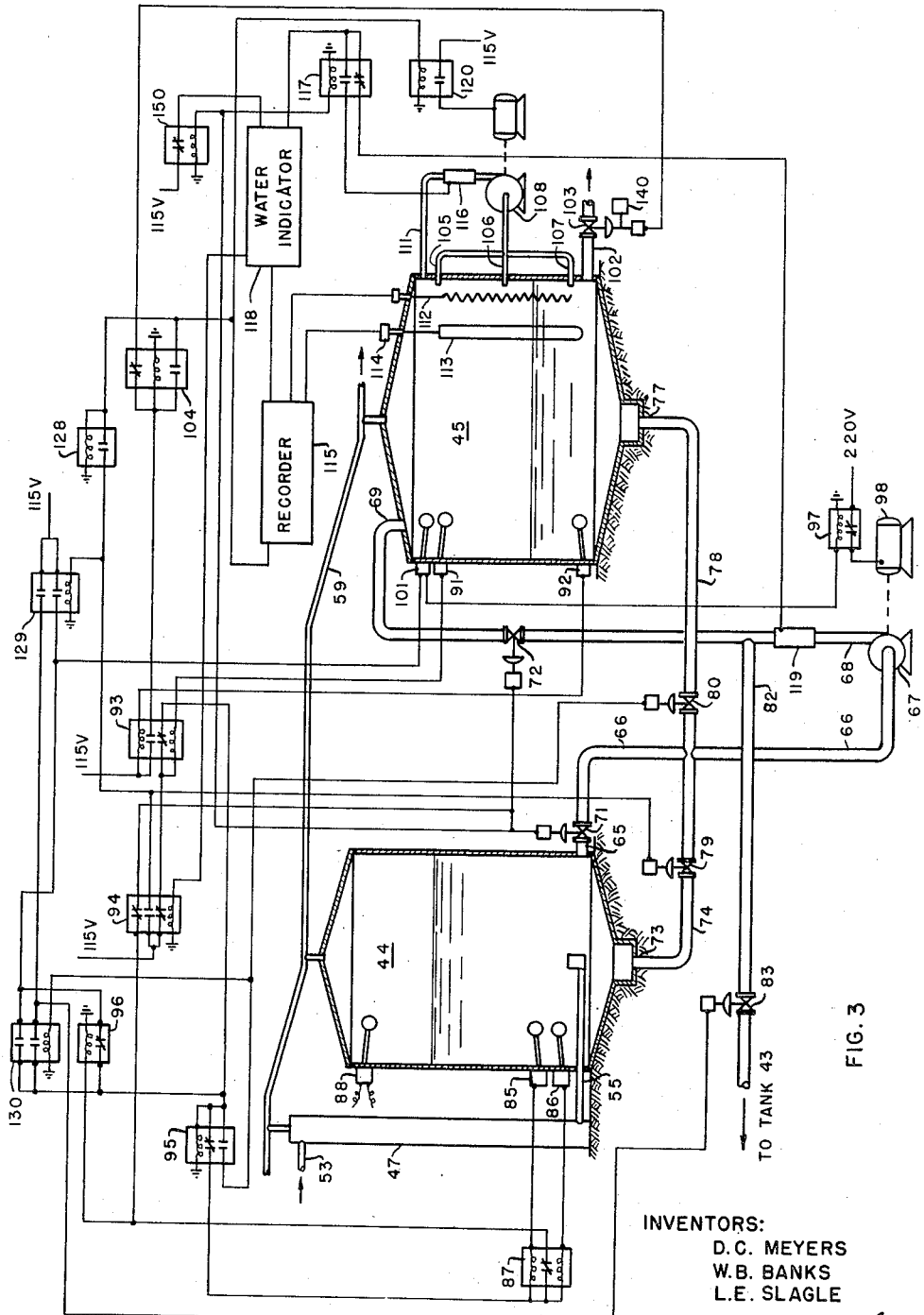

United States Patent Office 2,773,556
Patented Dec. 11, 1956

2,773,556

APPARATUS FOR AUTOMATICALLY TREATING AND METERING OIL FIELD PRODUCTION

Douglas C. Meyers, Midland, and William B. Banks, Odessa, Tex., and Lucian E. Slagle, New Orleans, La., assignors to Shell Development Company, New York, N. Y., a corporation of Delaware Application January 18, 1955, Serial No. 482,642

4 Claims. (Cl. 183—2.7)

This invention relates to the treating and metering of oil field production fluids, and pertains more particularly to apparatus adapted to separate, measure and record the gas, oil and water components of a fluid produced by an oil well.

After one or more wells have been drilled on a lease of land, many problems are encountered in transferring the production fluid produced by the wells from the wellheads to a pipe line for transportation to a refinery. In the transfer of production fluid from a producing lease to a purchaser or a pipe line, there are several fundamental operations which include initially refining or separating the production fluid into its component parts, and obtaining accurate determinations of the quantity and quality of the products. Throughout the transfer operations, it is necessary to comply with many regulations set up by the government and of other regulatory bodies.

Initial separation of the production fluid into its component parts is actually accomplished on the producing lease, that is, at a location adjacent one or more of the producing wells. Production fluid from oil wells is generally composed of crude oil, gas, and BS and W (bottom sediment and water), which is a waste product and has no marketable value.

Gas is separated from the crude oil and BS and W by a conventional separator which normally operates automatically and requires little manual attention. The pressure carried on the separator has a direct relationship to the volume of gas removed as well as to the richness of the gas and the gravity of the crude. In many oil fields, the pressure on the separator fluctuates with load conditions at a local gas-gasoline plant. It is therefore desirable to produce as many wells as possible when the load at the gasoline plant is low in order to increase the revenue received from the sale of gas and to prevent excess loss of gas and vapors from the lease tanks.

In providing apparatus for automatically treating and metering oil field production fluid during the transfer of the fluid from the wells to a pipe line, it is necessary to make some provision for removing the BS and W component from the production fluid in order for the fluid to be accepted and transported by a common carrier crude pipe line. Most pipe lines require that the BS and W component of the crude oil delivered to them be less than 1% in order to minimize formation of emulsions during the pumping of crude and in order to allow the pipe line to operate at its maximum capacity.

BS and W may be removed from crude oil by means of heat, settling chambers, and/or chemical treatment. In some oil fields, the wells which produce little if any water are produced directly into storage tanks without any treatment or separation of the BS and W component. Thus, the BS and W gradually builds up in the bottoms of the tanks until it rises to such a level that it mingles with the crude being delivered from the tanks and the crude becomes unacceptable to the pipe line companies. It then becomes necessary to steam these storage tanks and manually draw off the liquids in the bottoms thereof through drain lines, which liquid is either discarded or circulated through a treating system. It is therefore an object of this invention to provide an apparatus for automatically separating the oil and gas components of a production fluid and subsequently removing automatically the water from the crude oil so that the BS and W component of the crude oil is maintained at a value sufficiently low for the crude oil to be accepted by pipe line companies for transportation at all times.

Under present methods, accumulations of BS and W in storage tanks are removed by bleeding off the fluid in the bottom of a tank to a burn pit, which results in a loss of some marketable crude oil. Another object of this invention is to provide an apparatus for automatically removing the fluid from the bottom of storage tanks when the BS and W component thereof attains a value greater than that acceptable to pipe line companies and for automatically circulating the fluid removed from the said tanks through a treating system until the BS and W component of the fluid has fallen to a desired value.

The sale or delivery of a tank of crude oil from a producing lease to a pipe line company involves the coordinated efforts of both production and pipe line company personnel. Before the discharge valve of a storage tank is opened to deliver a volume of crude oil to the pipe line, the tank must be gauged and the temperature, gravity and BS and W content of the crude oil must be measured. After the desired quantity of crude oil has been run from the tank, a second gauge of the tank must be taken. It is necessary for a representative of the production company and a representative of the pipe line company to be present at both of these times to witness and come to an agreement as to the measurements and other data obtained which is then recorded on the delivery ticket. In view of the number of tank batteries and the number of tanks to be checked each day in an oil field, considerable time is required each day to obtain the necessary data from the tanks of crude oil prior to their delivery to a pipe line. A further object of the present invention is to provide apparatus adapted to receive the crude oil produced from a plurality of wells and to periodically measure the temperature, gravity and BS and W content of the crude in the measuring tank of said apparatus.

During the treating and measuring of crude oil in a tank battery, a considerable amount of bad oil normally accumulates in the bottom of the measuring tank which necessitates the periodic cleaning of the tank bottoms and the re-treating of bad oil. Thus, additional tanks have to be provided to be used as storage tanks or measuring tanks when the primary tanks are being cleaned. Therefore, another object of this invention is to provide apparatus for automatically treating and measuring crude oil which periodically removes the bad oil from the bottom of any of the tanks and returns it to the treating equipment to be again treated for removal of undesirable components, thus eliminating the necessity of additional storage tanks.

To assure that each well on a lease is producing its share of crude oil as allowed by government rules and regulations and to obtain producing data for engineering studies of well performance, it is necessary that periodic well tests be made. The majority of the leases in many fields have only one oil and gas separator and thus it is necessary that all wells be shut in except the one to be tested. It is therefore a further object of the present invention to provide an apparatus for automatically treating and measuring crude oil produced from a plurality of wells in an oil field, whereby each of the wells in the field may be periodically isolated so that the amount of oil produced from the well can be measured and its properties determined.

Another object of this invention is to provide an apparatus for automatically treating and metering crude oil production from a plurality of wells and transferring said oil to a pipe line, said apparatus being adapted to discontinue the delivery of crude oil to a pipe line when the water content of the oil exceeds the allowable set by the pipe line company, for example, 1%.

Still another object of the present invention is to provide an apparatus for automatically treating and metering crude oil produced from a plurality of wells, wherein the fluid flow lines to said apparatus are arranged in a manner and are operated under conditions such as to greatly reduce paraffin deposition in said flow lines.

Another object of the present invention is to provide an apparatus for automatically treating and metering crude oil production from a plurality of wells which may be shut in individually or as a group in the event of injury to the flow lines therefrom or failure of the treating and metering apparatus.

These and other objects of this invention will be understood from the following description taken with reference to the attached drawing, wherein:

Fig. 3 is a detailed view of two of the tanks of the present apparatus together with control means for controlling the flow of fluids through the tanks and means for indicating the properties of the fluid as it passes through tank.

Figure 1:
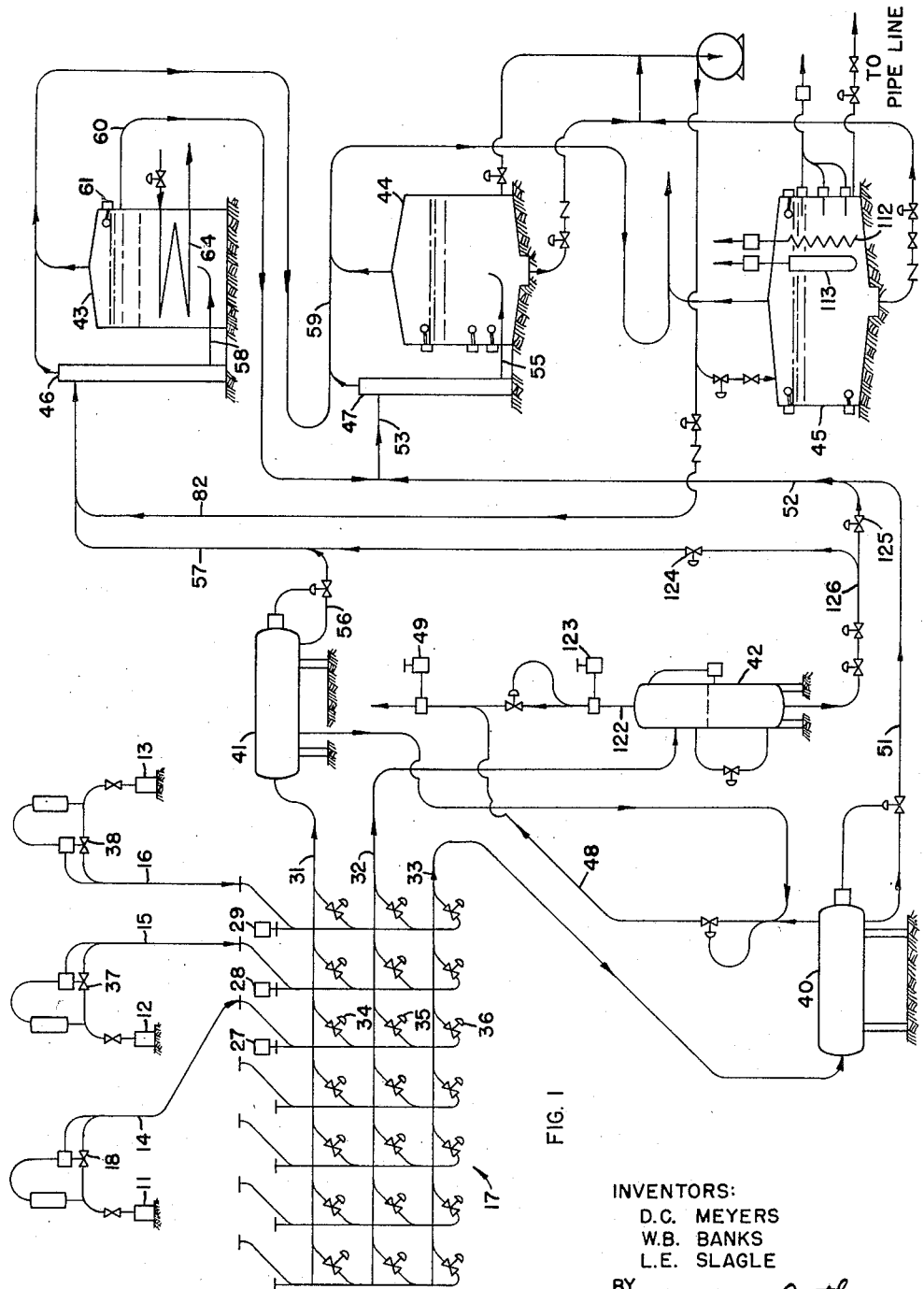
Fig. 1 is a schematic view illustrating the crude oil treating and metering apparatus of the present invention positioned in an oil field and connected to a plurality of wells.

Referring to Fig. 1 of the drawing, three well heads 11, 12 and 13 positioned at different locations in a well field are diagrammatically shown as being connected by means of production flow lines 14, 15 and 16 to a valve manifold system 17 adapted to receive the production fluid from a plurality of further wells, not shown.

Figure 2:
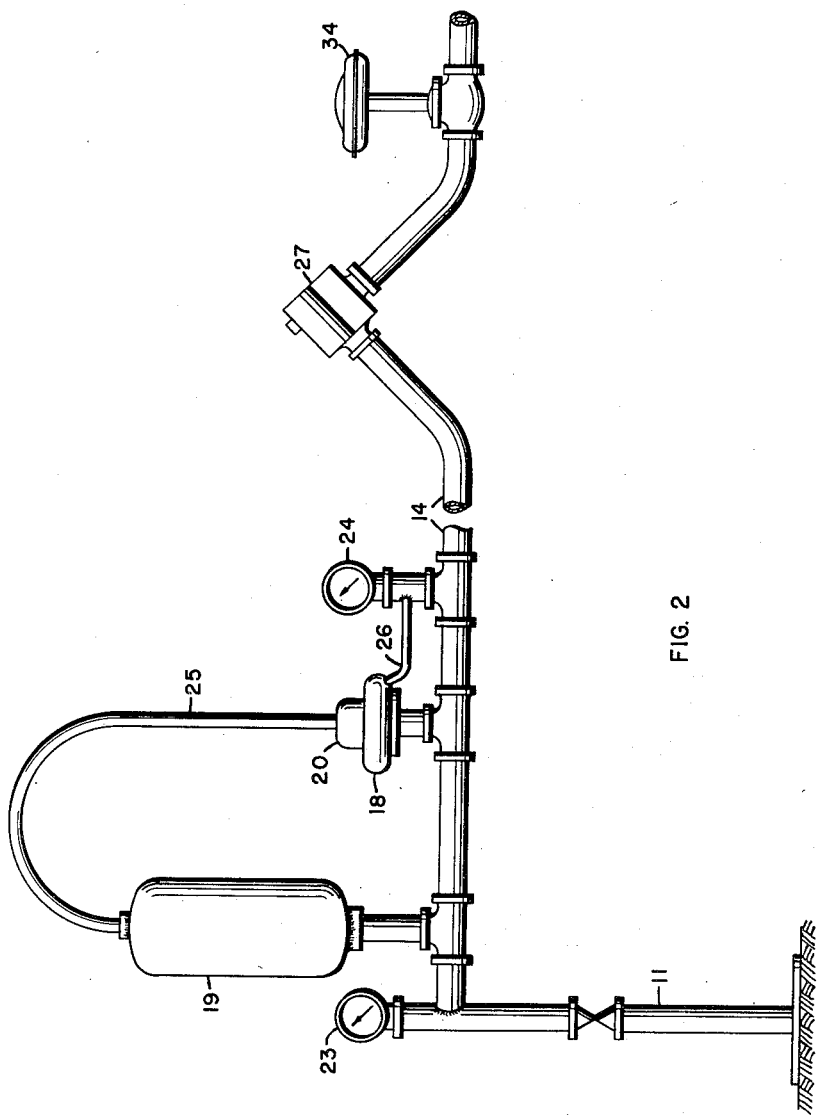
Fig. 2 is an enlarged view of a well control shown at 11 in Fig. 1, by which each individual well is connected to the crude oil treating and metering apparatus of the present invention.

As shown in Fig. 2, each well head 11 and its crude oil flow line 14 is provided with a regulator flow valve 18, preferably of the pressure-actuated diaphragm-type for controlling the flow of fluid from the well. Each flow valve 18 is provided with a gas accumulator chamber 19 in which gas pressure is stored for controlling the flow valve 18. The regulator flow valve 18 is provided with a high-low pressure regulator pilot valve 20 of a conventional type which actuates the flow valve 18 to close said valve when the pressure in the flow line 14 rises above or drops below a predetermined value. The well head installation is also provided with a pair of pressure gauges 23 and 24. Conduits 25 and 26 connect the high low pressure regulator 20 with the gas accumulator chamber 19 and with the production flow line 14 at a point downstream of the control valve 18.

The production flow line 14 extends from the well head 11 to the valve manifold or well hook-up system 17 which is located adjacent the tank battery of the present invention. A choke 27 is installed in each flow line, for example, flow line 14, to control to some extent the production of fluids through the line. While chokes are normally placed in the flow line at a position close to the well head, it has been found that substantial advantages will be realized by placing the chokes 27, 28 and 29 (Fig. 1) at a point adjacent the valve manifold or well hook-up system 17.

The valve manifold 17 comprises a desired number, for example, three main conduits 31, 32 and 33 which may be put in communication with any or all of the several wells in the oil field by suitable by-pass conduits provided with electrically-actuated or pressure-actuated two or three-way control valves to control the flow of fluid therethrough. For example, the flow of fluids through conduit 14 after passing through choke 27 may be directed into either of the conduits 31, 32 and 33 by opening the necessary valves 34, 35 or 36.

The well hook-up system described above is basically a means of shutting-in or flowing the several wells in the field to a central control point. By placing all the well chokes 27, 28 and 29 at the central valve manifold 17, the wells are in fact extended horizontally from the well heads to the manifold and the control of the wells, even to the choke adjustments, may be accomplished at the valve manifold 17 adjacent the tank battery. It has been found that by maintaining well flowing tubing pressure from the well heads up to the manifold 17, the deposition of paraffin in the flow lines 14, 15 and 16 is greatly reduced.

Automatic control of well fluid from the well heads 11, 12 and 13 through flow lines 14, 15 and 16 is obtained by the coordinated action of electrically-operated valves such as valve 34, at the manifold 17, and of pressure-operated regulator flow valves, such as valve 18, at the well heads. By installing electrically-operated valves at the manifold and pressure-operated valves at the well heads, the necessity of constructing and maintaining electrical lines to individual wells is eliminated. However, in certain installations it may be desirable to use electrically-operated valves at the well heads as well as at the manifold.

The regulator flow valve 18 at the well head 11 closes to shut the well in when the pressure in the flow line 14 rises above flowing pressure, and opens to allow delivery of fluid from the well when the pressure in the flow line 14 is reduced to a predetermined value. Additionally, in cases when the pressure in the flow line 14 drops to extremely low values, such as in the case of a flow line break, the regulator valve 18 will close to shut in the well. Thus, the danger of having shut-in pressure on the flow lines 14, 15 and 16 is eliminated while the flow of fluid from the well may be controlled by opening and closing the electrically-operated valves in the manifold 17.

The treating units of the present invention for treating and metering crude oil comprise a gas-oil separator 40, a gas-oil-water separator 41, a metering separator 42, a treating tank 43, a surge tank 44, and a metering tank 45. The treating tank 43 and the surge tank 44 are both provided with auxiliary gas separators or gas boots 46 and 47, respectively.

The gas-oil separator 40 and the gas-oil-water separator 41 which are connected to the manifold 17 by conduits 33 and 31, respectively, may be of any conventional design. The gas discharge ports of separators 40 and 41 are connected to a conduit 48 by which the gas is piped to a gasoline plant or to a suitable storage tank (not shown). A gas meter 49 is shown diagrammatically as being connected to the conduit 48 for measuring the volume of gas sent to the gasoline plant.

The oil discharge port in separator 40 is connected by means of conduits 51 and 52 to the inlet port near the top of the auxiliary gas separator 47. The discharge port near the bottom of the auxiliary gas separator 47 is connected by means of conduit 55 to the inlet port near the bottom of the surge tank 44.

Water discharged by the gas-oil-water separator 41 is run to a pit in the ground near the separator or to any other suitable disposal area. The oil discharge port of the separator 41 is connected by means of conduits 56 and 57 to the inlet port located near the top of the auxiliary gas separator 46. The oil discharge port at the bottom of the auxiliary gas separator 46 is connected to the oil inlet port of the treating tank 43 by means of conduit 58.

Gas in minor quantities separating from the crude oil in the treating tank 43, surge tank 44 and metering tank 45, or in the auxiliary gas separators 46 and 47 is all piped away into a common conduit 59 which leads to the gas plant or discharges to the atmosphere. The treating tank 43 is a large tank into which oil containing a small amount of water is run in at the bottom and allowed to bubble up through the water layer in the tank. The oil accumulates as a layer at the top of the tank and is run off through a conduit 60 into the standpipe or gas separator 47. The treating tank 43 is provided with an emergency high level float switch 61 which is connected to a control panel to close all the valves in the manifold 17 in an emergency when a fluid in the treating tank rises to an undesirable level. Preferably the treating tank 43 is provided with steam coils 64 which are connected to a suitable supply of steam whereby any emulsions of water and oil in the treating tank may be heated to facilitate the breaking thereof.

The surge tank 44 and the metering tank 45 are shown in greater detail in Fig. 3 of the drawing. The surge tank 44 provides temporary storage room for the crude oil production coming from the well as the metering tank 45 is being emptied. The inlet line 55 to the surge tank 44 may be located at any level, but is preferably positioned nearer the bottom to facilitate its connection with gas separator 47. The discharge port 65 of the surge tank 44 is connected through conduit 66 to a transfer pump 67. The discharge of the pump 67 is connected by means of conduit 68 to the inlet port 69 which is located near the top of the metering tank 65, as illustrated, but may be located near the bottom of the tank. Automatic control valves 71 and 72 are positioned in conduits 66 and 68, respectively.

The intake port of the pump 67 is also in communication with the drain port 73 of surge tank 44 through conduit 74. Likewise, the drain port 77 in the bottom of the metering tank 45 is connected through conduit 78 with the intake of the pump 67. Flow through the conduits 74 and 78 is controlled by electrically-actuated control valves 79 and 80, respectively. The discharge port of the pump 67 is also in communication through conduit 82 and control valve 83 with the treating tank 43 or its auxiliary gas separator 46.

The surge tank 44 is shown as provided with a pair of lower level float switches 85 and 86 which are electrically connected to a relay 87 for actuating said relay. If desired, a single float switch having a double pole contact may be employed to replace float switches 85 and 86. An upper level float switch 88 is mounted near the top of the surge tank 44 and is electrically connected to a relay (not shown) whereby all power to the control valves in the manifold 17 is shut off when the liquid level in the surge tank actuates the float switch 88, thereby causing all the wells to be shut in. Float switches 85 and 86 in the surge tank 44 start and stop the transfer pump 67. The float switches 85 and 86 are necessary to permit intermittent operation of the pump 67 since its capacity is several times greater than the normal production from all of the wells. Instead of float switches, other types of liquid level indicators well known to the art may be provided either inside or outside the surge and metering tanks, for example, magnetic type level indicators.

The metering tank 45 is also provided with upper and lower level float switches 91 and 92, respectively, which are connected through latching relays diagrammatically shown at 93 and 94 to operate the inlet valve 72 to the metering tank 45. The upper and lower float switches 91 and 92 of the metering tank 45 are also connected through latching relay 93, time delay relay 95, relay 96 and motor starter relay 97 to control the pump motor 98. The metering tank 45 is also provided with a normally-closed emergency upper-level float switch 101 which, when raised by the liquid in the tank, opens to break the circuit to the motor starter relay coil 97 to stop the pump motor 98 and pump 67. The discharge line 102 of the metering tank 45 is provided with automatic control valve 103 which is actuated by a time delay relay 104.

Means are provided for withdrawing a sample of oil simultaneously from several levels within the metering tank 45 when said tank is full. As shown in Fig. 3 of the drawing, the metering tank 45 is tapped at three levels by conduits 105, 106 and 107 which are connected by suitable conduit means to the intake of a small sampling pump 108 which is driven by an electric motor 109. The discharge port of the pump 108 is connected by means of a conduit 111 to the metering tank 45 so as to return the fluid sample to the tank.

Extending vertically through a major portion of the tank is a temperature-responsive element such, for example, as a resistance thermometer diagrammatically indicated at 112. Also positioned within the metering tank 45 is a gravity-measuring device diagrammatically indicated as a float 113 which is mechanically connected to indicating means 114 adapted to transmit a signal to a recorder 115. The temperature-responsive device 112 is also connected to the recorder 115 so that temperature and gravity readings may be continuously or periodically recorded by the recorder 115.

Positioned in the discharge conduit 111 from the sampling pump 108 is a water-cut indicating device of any suitable type, preferably of the capacitance-cell type, which measures the di-electric constant of the stream of the fluid being sampled. Since water-cut indicating devices of this type are well known to the art, they will not be further described at this time. The measuring cell 116 of the water-cut indicator is connected through a selector relay 117 to the balancing circuit of the water-cut indicator 118 which is in turn connected to the recorder 115. A similar measuring cell of the water-cut indicator 119 is positioned in the discharge conduit from the transfer pump 67 and is electrically connected through selector relay 117 to the same balancing circuits of the water-cut indicator 118. By this arrangement, the amount of water may be measured in the flow stream from either pump 67 or 108 as desired, with the signal being sent to balancing circuit of the single water-cut indicator 118. If desired, the individual water-cut measuring cells 116 and 119 can be connected to separate balancing circuits and separate recorders. The sampling pump motor 109 is provided with a starter relay 120.

The operation of the present automatic treating and metering installation of crude oil is as follows:

As shown in Fig. 1 of the drawing, the metering separator 42 is adapted to measure the amount of oil, water and gas produced by any one well when that well is connected to the intake conduit 32 of the metering separator 42 by the valve manifold 17. The gas separated by the metering separator 42 passes out through conduit 122 and into conduit 48 to the gas plant after passing through a gas meter 123 which measures the volume of gas directly in cubic feet. Automatic control valves 124 and 125 are provided in a discharge conduit 126 from the metering separator 42 for routing the well production fluid from the metering or test separator 42 either to the treating tank 43 or directly to the surge tank 44 depending upon whether the well being tested produced water or not. The metering or tested separator 42 is described in greater detail in copending application Serial No. 493,431 filed on March 10, 1955.

By employing the automatic treating and metering apparatus of the present invention, as shown in Figures 1 and 3 of the drawing, the following general operations are accomplished:

1. Fluid from a plurality of oil wells is combined at valve manifold 17 and piped to a separator where the production fluid is separated into its component parts.

2. Gas separated at the separators 40, 41 and 42 is sent to storage or to a gasoline plant.

3. The crude oil from a separator 41 which may contain a small amount of water is sent to the treating tank 43 where the water is allowed to separate out of the oil. Water-free oil separated by separator 40 is piped directly to the surge tank 45.

4. The oil from the treating tank 43 which is substantially free of water is sent to the surge tank 45.

5. Oil is accumulated in the surge tank 44 as the metering tank 45 is being drained.

6. The gravity, temperature and water content of the oil in the metering tank 45 are measured before the oil is pumped to a pipe line for delivery to a pipe line company.

7. After the charge of the oil in the metering tank 45 has been pumped to the pipe line, the oil in the bottom of the metering tank which may contain small amounts of water and sediment is pumped back to the treating tank.

8. In the event that the water-cut recorder 116 indicates that the water content of the oil in the metering tank 45 is above the maximum limit, say 1%, delivery of the oil to the pipe line is automatically stopped and the remainder of the oil in the metering tank 45 is automatically pumped back to the treating tank 43 for further treatment.

9. After a charge of oil has been pumped from the surge tank 44 to the metering tank 45, the oil in the bottom of the surge tank 44, which may contain some water and sediment, is pumped back to the treating tank 43.

10. If at any time during the transfer of oil from a surge tank 44 to the metering tank 45 the water content rises above a predetermined desired value, say 1%, delivery of oil from the surge tank to the metering tank is automatically stopped and the remainder of oil in the surge tank 44 is automatically pumped back to the treating tank 43.

11. Power to the transfer pump 67 is cut off before the metering tank 45 can be completely filled.

12. All the wells in the field are automatically shut-in at the valve manifold 17 before the surge tank 44 completely fills and overflows.

13. Each individual well in the field may be periodically and automatically tested on a predetermined schedule by the manifold 17 which automatically diverts the flow of one well through the metering separator 42.

14. No oil is delivered from the metering tank to the pipe line unless the water content is below a predetermined value.

In normal operation, oil is always flowing into surge tank 44. Any small amount of gas which separates from the oil at the top of the stand pipe or gas separator 47 passes out through line 59 to the atmosphere. The crude oil treating and metering apparatus of the present invention is diagrammatically shown in Figure 3 of the drawing at a time when surge tank 44 is being emptied and metering tank 45 is being filled.

The metering tank 45 is filled by oil from the surge tank 44 pumped through discharge valve 71 and line 66 to the pump 67 which is driven by motor 98. The discharge stream from the pump 67 passes out through line 68, through inlet valve 72 and into the top of the metering tank 45 at 69. The level of the oil in the surge tank 44 continues to drop during the pumping operations since the capacity of the pump is greater than the production of the wells feeding oil into the surge tank. The level of the oil in the metering tank 45 rises until it contacts and raises float switch 91. The signal from switch 91 goes to the latching relay 93 which shuts the inlet valve 72 of the metering tank 45 and the outlet valve 71 of the surge tank 44.

When the lower contact in relay 93 is closed, current passes through the upper contact of the time delay relay 95 and through the contact of the latching relay 87 to the coil in relay 96 causing its contact to be closed. This in turn energizes the coil in the motor-starter relay 97 whose contact closes energizing motor 98. The contact in relay 87 is opened when its lower release coil is energized. This occurs when the fluid in the surge tank drops below the float switch 86. The contact in relay 87 is closed when the upper latching-coil is energized by the action of fluid in the surge tank rising above the float switch 85.

The adjustable time-delay relay 104, which for example, may be set at an interval of 15 minutes, is not in operation as illustrated in Figure 3, but during its 15 minute operating period opens the upper contact in relay 104 and closes the bottom contact therein. The emergency float switch 101 is normally closed until actuated by rising fluid in the metering tank 45. This action breaks the circuit to the motor-starter relay coil 97 which stops the pump.

When the metering tank 45 is filled, the contacts of the latching relay 93 are reversed from the position shown to the opposite position upon the closing of float switch 91 which causes valves 71 and 72 to close and the pump 67 to stop. With the upper contact of relay 93 closed, the time delay relay 104 is energized and the time delay period (say 15 minutes) begins, with the contacts of said relay opened and closed in a manner opposite from that shown. This energizes the time delay relay 128, with its contact in a position opposite from that shown (for 15 minutes) and also starts the crude oil properties recorder 115 and the sampling pump starter relay 120 which starts the motor 109 and its sampling pump 108 for a fifteen minute period.

When the discharge valve 71 of the surge tank 44 and the inlet valve 72 of the metering tank 45 are de-energized or closed, the relay 117 reverses its contacts from the position shown to switch the water-cut balancing circuit 118 from measuring cell 119 to the measuring cell 116. During the fifteen minute sampling period while the fluid in the metering tank 45 is settling, the sample pump 108 pulls samples preferably from several points in the tank and pumps it through the water-measuring cell 116 and returns it through conduit 111 to the top of the tank.

During the same fifteen minute sampling period, the recorder 115 records the gravity of the oil measured by the buoyancy-type gravity transmitter 114, the temperature of the oil from a resistance-type temperature element 112, and the amount of basic sediments and water present as indicated by the water-detector 118. The recorder also indicates the number of times that the metering tank has been emptied and hence the volume of oil which has been delivered to the pipeline. Also during the fifteen minute sampling period, the contact in relay 128 is closed which energizes relay 129 to close both contacts thus energizing pump motor 98 through closed float switch 101. At the same time the bottom outlet valve 79 of surge tank 44 and the re-circulating valve 83 in flow line 82 to the treating tank 43 (Figure 1) opens so that the fluid in the bottom of the tank 44 is drawn out through line 74, valve 79, line 66, into pump 67, line 68, cell 119, and line 82, for fifteen minutes, thus re-circulating it back into the treating tank.

At the end of the timing period of relay 104, the contacts of both relays 104 and 128 are in the position shown thus stopping the recording of data by property recorder 115, stopping the sampling pump 108, and causing valves 79 and 83 to close and motor 98 and pump 67 to stop. With the contacts of relays 104 and 128 positioned as shown, the outlet valve 103 of the metering tank 45 opens permitting drainage of the oil in the metering tank to a crude oil pipe line for transportation to a refinery or central storage. At the time oil is being drained from the metering tank 45, the oil being produced by the various wells is produced into the surge tank 44. When the level in the tank 45 drops low enough to actuate the lower float switch 92, the switch closes the energizing release coil of the latching relay 93 causing it to assume the position shown. This energizes the time-delay relay 95 and its contacts are reversed from the position shown until the end of the time delay (say, 15 minutes) at which time they are automatically reversed.

Throughout the fifteen minute period which is controlled by the adjustable time-delay relay 95, its lower contact is closed causing the bottom drain off valve 80 of metering tank 45 to open. Also the coil in relay 130 is energized causing its two contacts to close thus starting a pump motor 98 and pump 67 and opening valve 83 so that the fluid in the bottom of the metering tank 45 is drawn out through lines 78, valve 80, line 66 into pump 67 to be discharged through conduit 68, water-cut measuring cell 119, conduit 82 and valve 83 to be returned to the treating tank 43 (Figure 1). After the fifteen minute draining period for the metering tank 45, a time delay relay 95 assumes the setting as illustrated thus switching water-cut measuring cells 119 and 116 to the water detector 118 and opening valves 71 and 72 to start the filling cycle of the metering tank 45 all over again.

If during the filling of metering tank 45 the fluid passing through water-cut measuring cell 119 should be detected to contain more than 1% water (or more than any predetermined safe amount), the water-detecting instrument 118 energizes the coil of relay 94 causing all three contacts to reverse from the position illustrated. This cuts off power to relay 93, relay 87 and relay 96 causing valves 71 and 72 to close and valve 79 to open. At the same time the contacts of relay 129 close to start pump 67 and open valve 83 so that the fluid in the surge tank 44 may be re-circulated back to the treating tank 43 (Figure 1) until the amount of water in the oil in the surge tank 44 drops below the 1% desired limit, at which time all the relays and valves return to the positions as shown so that the fluid is again pumped from the surge tank 44 into the metering tank 45. If desired an electrical, pneumatic or mechanically-actuated counter 140 may be operatively-connected to discharge valve 103 to count the number of times tank 45 is emptied and hence the volume of oil transferred to the pipeline.

The water-cut measuring cell 119 only controls the recirculation of fluid during the filling cycle of metering tank 45 since the coil of relay 150 is energized only when the inlet valve 72 to the metering tank 45 is energized. Otherwise, the water-cut measuring cell 119 is cut out at stationary fluids standing in the cell often indicates a higher water content than actually exists.

An installation of the present apparatus for automatically treating and metering crude oil has been installed in a West Texas oil field and has operated with extremely high accuracy. Test data show the accuracy of the present system to be at least as accurate and normally considerably more accurate than normal means of manually gauging and testing the properties of fluid in tanks. Additionally, apparatus has been provided for automatically preventing the delivery of any crude oil to pipe lines when the water content of the crude oil is above a predetermined maximum and means are provided for automatically re-circulating and treating said crude oil until the water content has again dropped below the desired value, at which time delivery of oil to the pipe line is automatically resumed.

We claim as our invention:

1. A system for automatically treating and metering oil well production fluid prior to its delivery to a pipe line comprising a gas-oil separator adapted to receive well fluid from a plurality of wells and to separate the gas component therefrom, a treating tank, a surge tank, a metering tank, conduit means in communication between said separator and said treating tank, between said treating tank and said surge tank and between said surge tank and said metering tank, fluid transfer pump means in said conduit means between said surge and said metering tanks, said surge and said metering tanks being provided with drain ports for periodically removing the substantially stagnant fluid from the bottoms thereof, return conduit means in communication from said drain ports of said tanks through said transfer pump means to said treating tank for recirculating the stagnant fluids for treatment in said treating tank, discharge fluid port means in said metering tank provided with power-actuated valve means in communication with said pipe line, power-actuated valve means in each of said conduit means leading to and from said fluid transfer pump, electrical circuit means for actuating said valve means on a predetermined cycle to automatically fill and empty said metering tank and to recirculate the substantially stagnant liquid from the bottoms of said surge and metering tanks back to said treating tank, and means electrically-connected to said circuit means for detecting and indicating the water content of the oil leaving the surge and metering tanks, said water-indicating means adapted to actuate said circuit means and said valve means for recirculating oil from the surge and metering tanks back to said treating tank when the water content of said oil exceeds a pre-set value.

2. A system for automatically treating and metering oil well production fluid prior to its delivery to a pipe line comprising a gas-oil separator adapted to receive well fluid from a plurality of wells and to separate the gas component therefrom, a treating tank, a surge tank, a metering tank, conduit means in communication between said separator and said treating tank, between said treating tank and said surge tank and between said surge tank and said metering tank, fluid transfer pump means in said conduit means between said surge and said metering tanks, said surge and said metering tanks being provided with drain ports for periodically removing the substantially stagnant fluid from the bottoms thereof, means in communication with the oil in said metering tank for measuring the temperature, specific gravity and water content of said oil, recorder means for periodically recording said temperature, specific gravity and water content measurements, return conduit means in communication from said drain ports of said tanks through said transfer pump means to said treating tank for recirculating the stagnant fluids for treatment in said treating tank, discharge fluid port means in said metering tank provided with power-actuated valve means in communication with said pipe line, power-actuated valve means in each of said conduit means leading to and from said fluid transfer pump, and electrical circuit means for actuating said valve means on a predetermined cycle to automatically fill and empty said metering tank and to recirculate the substantially stagnant liquid from the bottoms of said surge and metering tanks back to said treating tank.

3. A system for automatically treating and metering oil well production fluid prior to its delivery to a pipe line comprising a gas-oil separator adapted to receive well fluid from a plurality of wells and to separate the gas component therefrom, a treating tank, provided with heating means for heating said well fluid and separating substantially all of the water therefrom, a surge tank adapted to receive substantially water-free oil from said treating tank, a metering tank for continuously measuring predetermined volumes of oil being transferred from said surge tank to said pipe line, conduit means in communication between said separator and said treating tank, between said treating tank and said surge tank and between said surge and said metering tank, fluid transfer pump means in said conduit means between said surge and said metering tanks, said surge and said metering tanks being provided with drain ports for periodically removing the substantially stagnant fluid from the bottoms thereof, return conduit means in communication from said drain ports of said tanks through said transfer pump means to said treating tank for recirculating the stagnant fluids for treatment in said treating tank, discharge fluid port means in said metering tank provided with power-actuated valve means in communication with said pipe line, power-actuated valve means in each of said conduit means leading to and from said fluid transfer pump, electrical circuit means for actuating said valve means on a predetermined cycle to automatically fill and empty said metering tank and to recirculate the substantially stagnant liquid from the bottoms of said surge and metering tanks back to said treating tank, and water-indicating means mounted in said conduit means between said surge and metering tanks and electrically-connected to said circuit means for indicating the water content of the oil in the conduit means and altering said circuit means when the water content rises above a pre-set value whereby said valve means are actuated to return the oil in said surge tank to said treating tank.

4. A system for automatically treating and metering oil well production fluid prior to its delivery to a pipe line comprising a gas-oil separator adapted to receive well fluid from a plurality of wells and to separate the gas component therefrom, a treating tank, a surge tank, a metering tank, conduit means in communication between said separator and said treating tank, between said treating tank and said surge tank and between said surge tank and said metering tank; fluid transfer pump means in said conduit means between said surge and said metering tanks, said surge and said metering tanks being provided with drain ports for periodically removing the substantially stagnant fluid from the bottoms thereof, temperature-measuring means in said metering tank, specific gravity measuring means in communication with the oil in said metering tank, first water-indicating means in communication with the oil in said metering tank, recorder means for periodically recording said indicated temperature specific-gravity and water content, return conduit means in communication from said drain ports of said tanks through said transfer pump means to said treating tank for recirculating the stagnant fluids for treatment in said treating tank, discharge fluid port means in said metering tank provided with power-actuated valve means in communication with said pipe line, power-actuated valve means in each of said conduit means leading to and from said fluid transfer pump, electrical circuit means for actuating said valve means on a predetermined cycle to automatically fill and empty said metering tank and to recirculate the substantially stagnant liquid from the bottoms of said surge and metering tanks back to said treating tank, and second water-indicating means electrically-connected to said circuit means for detecting and indicating the water content of the oil leaving the surge tank, said water-indicating means adapted to actuate said circuit means and said valve means for recirculating oil from the surge tank back to said treating tank when the water content of said oil exceeds a pre-set value.

References Cited in the file of this patent

UNITED STATES PATENTS

| | | |
|---|---|---|
| 2,457,959 | Walker | Jan. 4, 1949 |
| 2,682,353 | Bills et al. | June 29, 1954 |